(12) United States Patent
Herbin et al.

(10) Patent No.: US 7,987,052 B2
(45) Date of Patent: Jul. 26, 2011

(54) METHOD FOR EVALUATION, BY MOTOR VEHICLE, OF THE CHARACTERISTICS OF A FRONT ELEMENT

(75) Inventors: Anne Herbin, Paris (FR); Joël Leleve, Epinay sur Seine (FR)

(73) Assignee: Valeo Vision, Bobigny (FR)

(*) Notice: Subject to any disclaimer, the term of this patent is extended or adjusted under 35 U.S.C. 154(b) by 811 days.

(21) Appl. No.: 11/557,284

(22) Filed: Nov. 7, 2006

(65) Prior Publication Data

US 2007/0198189 A1    Aug. 23, 2007

(30) Foreign Application Priority Data

Nov. 10, 2005  (FR) ...................................... 05 11488

(51) Int. Cl.
*G08G 1/16* (2006.01)
(52) U.S. Cl. ......... 701/301; 700/300; 382/104; 382/154
(58) Field of Classification Search .................. 701/301, 701/300; 700/300; 340/435, 436, 461; 348/148, 348/221.1, 42, 47, 48; 356/3.14; 382/103, 382/104, 106, 154, 276
See application file for complete search history.

(56) References Cited

U.S. PATENT DOCUMENTS

| | | | | |
|---|---|---|---|---|
| 5,410,346 A | * | 4/1995 | Saneyoshi et al. | 348/116 |
| 5,530,420 A | * | 6/1996 | Tsuchiya et al. | 340/435 |
| 6,169,572 B1 | * | 1/2001 | Sogawa | 348/113 |
| 6,370,261 B1 | * | 4/2002 | Hanawa | 382/104 |
| 6,396,397 B1 | * | 5/2002 | Bos et al. | 340/461 |
| 2003/0154010 A1 | * | 8/2003 | Rao et al. | 701/45 |
| 2004/0054473 A1 | * | 3/2004 | Shimomura | 701/301 |
| 2005/0030378 A1 | | 2/2005 | Stiller | |
| 2005/0185049 A1 | * | 8/2005 | Iwai et al. | 348/47 |
| 2008/0036576 A1 | * | 2/2008 | Stein et al. | 340/425.5 |

FOREIGN PATENT DOCUMENTS

JP           10320558 A    12/1998

* cited by examiner

*Primary Examiner* — Khoi Tran
*Assistant Examiner* — Stephen Holwerda
(74) *Attorney, Agent, or Firm* — Jacox, Meckstroth & Jenkins

(57) ABSTRACT

A method that utilizes at least a first camera and a second camera, which have optical axes that are parallel to a first axis of an orthogonal reference frame, the first and the second camera being positioned so as to have a first offset along a second axis and a second offset along a third axis of the orthogonal reference frame. The first offset is used to carry out a first stereoscopic calculation, and the second offset is used to carry out a second stereoscopic calculation, the distance sought finally being established by taking into consideration these two stereoscopic calculations.

19 Claims, 2 Drawing Sheets

METHOD FOR EVALUATION, BY MOTOR VEHICLE, OF THE CHARACTERISTICS OF A FRONT ELEMENT

BACKGROUND OF THE INVENTION

1. Field of the Invention

The present invention relates to a method for evaluation, by a motor vehicle, of the characteristics of a front element. The term "front element" is used to denote any object, which may or may not be moving and which may or may not be living, disposed in front of the vehicle in question, on a road along which it is travelling or at the edge of this road. For example, it may be another motor vehicle, which may be moving or stationary, or a pedestrian crossing the road. One essential characteristic of the front element, which the method according to the invention makes it possible to determine with precision, is a distance between said vehicle and the front element in question. In some embodiments of the method according to the invention, an additional characteristic of the front element which is determined is the height of the front element. The present invention also relates to any motor vehicle which is able to implement such a method.

2. Description of the Related Art

The general field of the invention is that of motoring safety, and more particularly that of the detection of obstacles by a vehicle in question. In this field, the aim is to determine as rapidly as possible the presence of front elements which are likely to present a risk of collision with the vehicle in question, so as to warn the driver, by means of an audible, visible or other signal, of the proximity of an obstacle and optionally of the nature of this obstacle. One essential characteristic that has to be determined is therefore in particular the distance separating the vehicle from the front element. It may also be beneficial to determine other characteristics of the front element, such as the dimensions, and in particular the height, so as to have a greater awareness of the front element in question.

In the prior art, solutions exist which make use of equipment of the radar type, or of the lidar type, which make it possible to determine with precision certain characteristics of a front element. However, the cost of such equipment means that motor vehicle manufacturers often rule it out. Consequently, most of the solutions proposed for determining the characteristics of a front element are based on the use of at least one camera. Among these solutions, there are firstly those which make use of a single camera; this type of solution is based on a postulate which greatly impairs the precision of the determinations: this postulate consists in considering that any front element arranged at a given distance is characterized by a standard width. Implicitly, this postulate implies that a front element is necessarily another vehicle. The determination of the distance between the vehicle implementing such a solution and a pedestrian is consequently highly erroneous, and therefore is of no use. Furthermore, such a solution relies greatly on the attitude of the vehicle, which can give rise to distance estimates that are as much as double the actual distance.

Among the solutions proposed in the prior art, there are also those which make use of two cameras, with which stereoscopic calculation rules are applied in order to determine the distance separating the vehicle in question from the detected front element. One example of such a solution is shown in FIG. 1. This figure schematically shows a plan view of a motor vehicle 100. It comprises a first camera 101 and a second camera 102, arranged respectively at a left headlamp and at a right headlamp. In this figure, like in the following figures which will be used to illustrate the invention, an orthogonal reference frame 103 is considered, which has an origin O referenced to any fixed point on the vehicle, for example located on a front bumper, an abscissa axis (Ox) oriented parallel to a direction of displacement 104 of the vehicle 100, a horizontal applicate axis (Oy) and a vertical ordinate axis (Oz). The first camera 101 and the second camera 102 are positioned such that they both have an optical axis that is generally parallel to the abscissa axis. The expression "axes that are generally parallel" refers to the fact that the axes in question are either strictly parallel or have—or their orthogonal projection onto a horizontal plane has—an angle of a few degrees, at most ten. Furthermore, in the examples of the prior art, the two cameras that are used are arranged such that they have only one offset along the applicate axis. It is this single offset D which is used to carry out a stereoscopic calculation, making it possible to arrive at an evaluation of the distance between the vehicle in question and any front element 105.

However, this type of solution has a significant defect: the stereoscopic calculation which is carried out is directly dependent on the very precise positioning of the two cameras; no verification of the stereoscopic calculation is provided. If there is the slightest variation in the offset along the applicate axis, the error will automatically be passed on to the distance evaluation. Such variations are frequent since the cameras are subjected to considerable temperature variations due to the fact that they are positioned in the headlamps. Moreover, at least one of the two cameras used is exclusively reserved for the stereoscopic calculation, with no application to date requiring the presence of two cameras in two headlamps arranged at each side of the front of the vehicle.

There is therefore a need to provide a method that overcomes one or more of the problems of the prior art.

SUMMARY OF THE INVENTION

An object of the invention is therefore essentially to propose a solution for improving the precision of distance measurements along a first axis and additionally along a second axis. The measurements along the first axis are carried out using a stereoscopic method, and the measurements along the second axis are carried out using a three-dimensional viewing method.

It is an object of the invention to solve all of these problems that have just been mentioned. In one embodiment of the invention, a solution is proposed which makes it possible in particular to improve the precision of distance measurements between the vehicle implementing the method according to the invention and a front element. In one particular embodiment of the invention, at least one additional characteristic of a front element in question is also established, for example the height of said front element. To this end, the invention provides for the use of at least a first camera and a second camera having optical axes that are generally parallel to a first axis of an orthogonal reference frame, the first and the second camera being positioned so as to have a first offset along a second axis and a second offset along a third axis of the orthogonal reference frame. The first offset is used to carry out a first stereoscopic calculation, and the second offset is used to carry out a second stereoscopic calculation, the distance sought finally being established by taking into consideration these two stereoscopic calculations. Advantageously, the first camera and the second camera are cameras which are used in other applications implemented within the vehicle in question.

Stereoscopic calculations are known from the prior art. The general principle thereof is based on the synchronous capture of two different images of one and the same object—the front element within the context of the invention. Each of the (minimum) two stereoscopic calculations involved in the invention combines knowledge of one of the two offsets with suitable trigonometric calculations so as to each propose a distance evaluation.

The invention therefore relates essentially to a method for evaluation, within a motor vehicle, of the characteristics of a front element, said motor vehicle being equipped at least with a first camera and a second camera, wherein the method comprises the various steps of:

placing the first camera in a first position and the second camera in a second position, the first position and the second position being characterized in particular by the fact that, considering an orthogonal three-dimensional reference frame having an abscissa axis oriented parallel to a direction of displacement of the vehicle, a horizontal applicate axis and a vertical ordinate axis:

the first camera and the second camera respectively have a first optical axis and a second optical axis that are generally parallel to the abscissa axis;

the first camera and the second camera have a first offset along the applicate axis;

the first camera and the second camera have a second offset along the ordinate axis;

establishing a first evaluation of a distance separating the vehicle from the front element by using the first offset to carry out a first stereoscopic calculation;

establishing a second evaluation of the distance separating the vehicle from the front element by using the second offset to carry out a second stereoscopic calculation; and determining the distance separating the vehicle from the front element by combining the first distance evaluation and the second distance evaluation.

In addition to the main features that have just been mentioned, the method according to the invention may have one or more of the following additional features:

the method comprises the additional step of, prior to the steps of establishing the first distance evaluation and the second distance evaluation, carrying out a calibration operation on the cameras to determine the relative positions of said cameras;

the method comprises the additional step consisting in storing the relative positions of the cameras for each calibration operation carried out;

the method comprises the various additional steps of:

for each new calibration operation, comparing the obtained relative positions with the last stored relative positions;

if a difference greater than a predetermined threshold results from the comparison operation, indicating a probable error in the determination of the distance separating the vehicle from the front element;

the calibration operation is carried out only when the vehicle is stationary;

the calibration operation is carried out each time the ignition of the vehicle is started;

the calibration operation is carried out when the vehicle, with the engine running, reaches a zero speed;

the operation consisting in combining the first distance evaluation and the second distance evaluation, in order to determine the distance separating the vehicle from the front element, is carried out by forming a weighted mean of the first distance evaluation and of the second distance evaluation, the first distance evaluation being associated with a first weighting coefficient and the second distance evaluation being associated with a second weighting coefficient, the first weighting coefficient and the second weighting coefficient respectively depending on a risk factor concerning the risk of variation in the first offset and second offset, respectively;

the first camera is arranged at a rear view mirror of the vehicle, and the second camera is arranged at a front headlamp of the vehicle;

the first camera is also used for an operation of detecting lines and/or kerbs, and the second camera is used for a functionality directly connected with a lighting functionality;

the second offset is used to determine a height of the front element.

Another object of the invention is a motor vehicle equipped at least with a first camera and a second camera for determining, by means of stereoscopic calculation, characteristics of a front element, characterized in that the first camera is placed in a first position and the second camera is placed in a second position, the first position and the second position being characterized in particular by the fact that, considering an orthogonal three-dimensional reference frame having an abscissa axis oriented parallel to a direction of displacement of the vehicle, a horizontal applicate axis and a vertical ordinate axis:

the first camera and the second camera respectively have a first optical axis and a second optical axis that are generally parallel to the abscissa axis;

the first camera and the second camera have a first offset along the horizontal applicate axis;

the first camera and the second camera have a second offset along the vertical ordinate axis.

The motor vehicle according to the invention comprises in particular elements of the computer, microprocessor, memory, data exchange means, etc. type, which are necessary in order to carry out the various calculation and/or storage operations that will be mentioned below.

The invention and its various applications will be better understood from reading the following description and by referring to the accompanying figures. These figures are given solely by way of example and do not limit the invention in any way.

In the figures:

DETAILED DESCRIPTION OF PREFERRED EMBODIMENTS OF THE INVENTION

In the various figures, elements which are common to more than one figure will retain the same references, unless stated otherwise.

Figure 1:
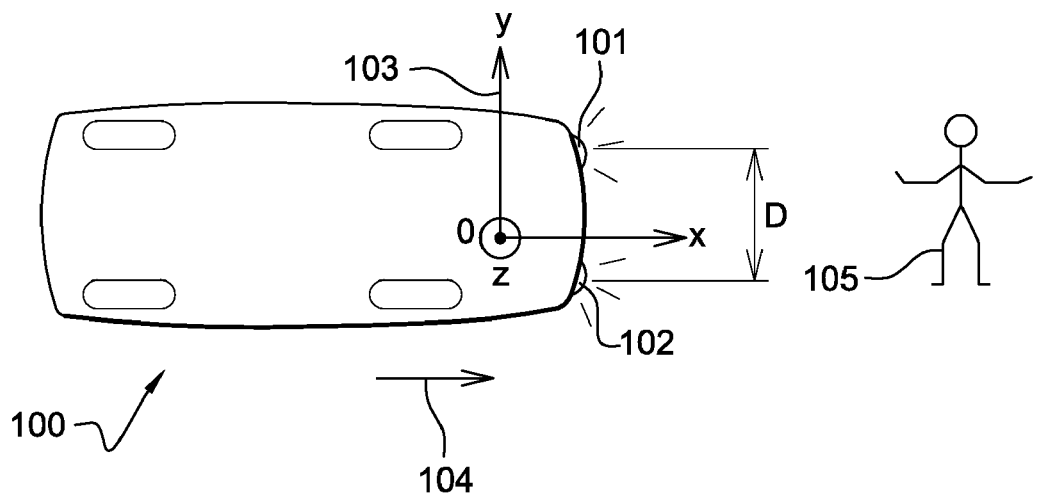
FIG. 1, already described, shows a schematic plan view of a vehicle capable of implementing a method according to the prior art for determining a distance from front elements.
Figure 2:
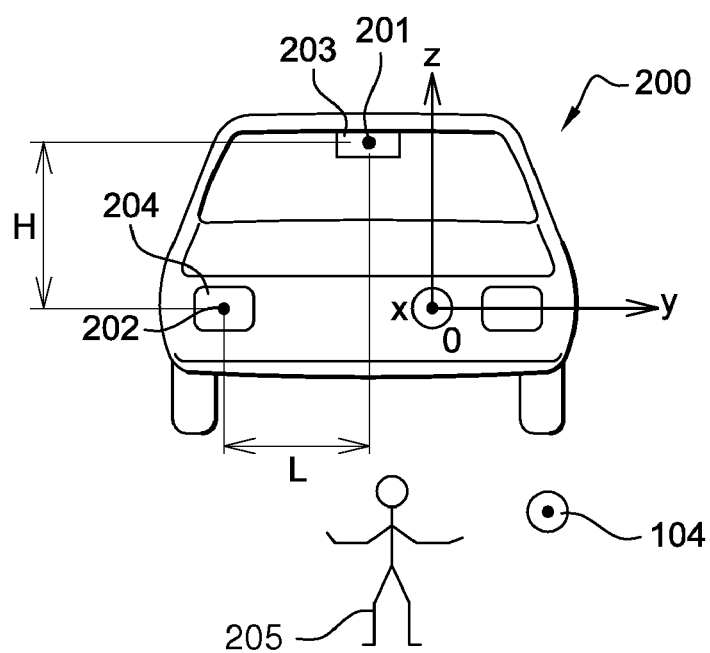
FIG. 2 shows a schematic front view of a vehicle capable of implementing a method according to the invention for evaluating the characteristics of a front element.

FIG. 2 shows a front view of an example of a vehicle 200 capable of implementing an example of embodiment of the method according to the invention. The vehicle 200 is in particular equipped at least with a first camera 201 and a second camera 202. In the example shown, the first camera is arranged at an internal rear view mirror 203 of the vehicle 200, and the second camera is arranged at a front headlamp 204, in the example here the right headlamp. The first camera 201 and/or the second camera 202 can be used to implement applications such as attitude correction, detection of lines and/or kerbs, rain detection, fog detection, management of the lighting system, etc. The method according to the invention can thus be implemented by means of cameras that are already present on some motor vehicles, with the use of such cameras becoming more and more common. The cost of implementing the method according to the invention is therefore not high.

In the invention, it is proposed to arrange the first camera 201 and the second camera 202 such that, when considering the orthogonal reference frame 103, they have a first offset L and respectively a second offset H along the applicate axis (Oy) and along the ordinate axis (Oz), respectively. In the invention, it is proposed, for any detected front element, to carry out a first stereoscopic calculation on the basis of fixed images, captured at the same point in time by each of the two cameras 201 and 202, and the first offset L. A first distance evaluation D1 is thus obtained for any detected front element 205. A second distance evaluation of the front element in question is then performed by carrying out a second stereoscopic calculation, again on the basis of fixed images captured at the same point in time by each of the two cameras 201 and 202, optionally the fixed images that were used to calculate the first distance evaluation, and the second offset H. The second distance evaluation D2 is thus obtained.

In the invention, the evaluations D1 and D2 are then combined. In some embodiments of the method according to the invention, a mean of the evaluations D1 and D2 is formed so as to determine the distance separating the front element in question from the vehicle. In other examples of embodiment, it is proposed to weight the evaluations D1 and D2 in the mean formed therefrom. In such examples, a high weighting coefficient is assigned to the distance evaluation established on the basis of the offset having the least likelihood of fluctuating over time. The fluctuation of the offsets L and/or H may be directly associated with thermal and/or mechanical stresses to which the cameras 201 and 202 are subjected.

Furthermore, in some embodiments, it is proposed to use the offset H to determine the height of the front element in question. This determination is carried out according to three-dimensional viewing principles, by comparing two fixed images captured at the same point in time by the cameras 201 and 202, for example by exploiting a difference in the number of rows of pixels, for each of the images captured, visible below and above the front element 205.

Figure 3:
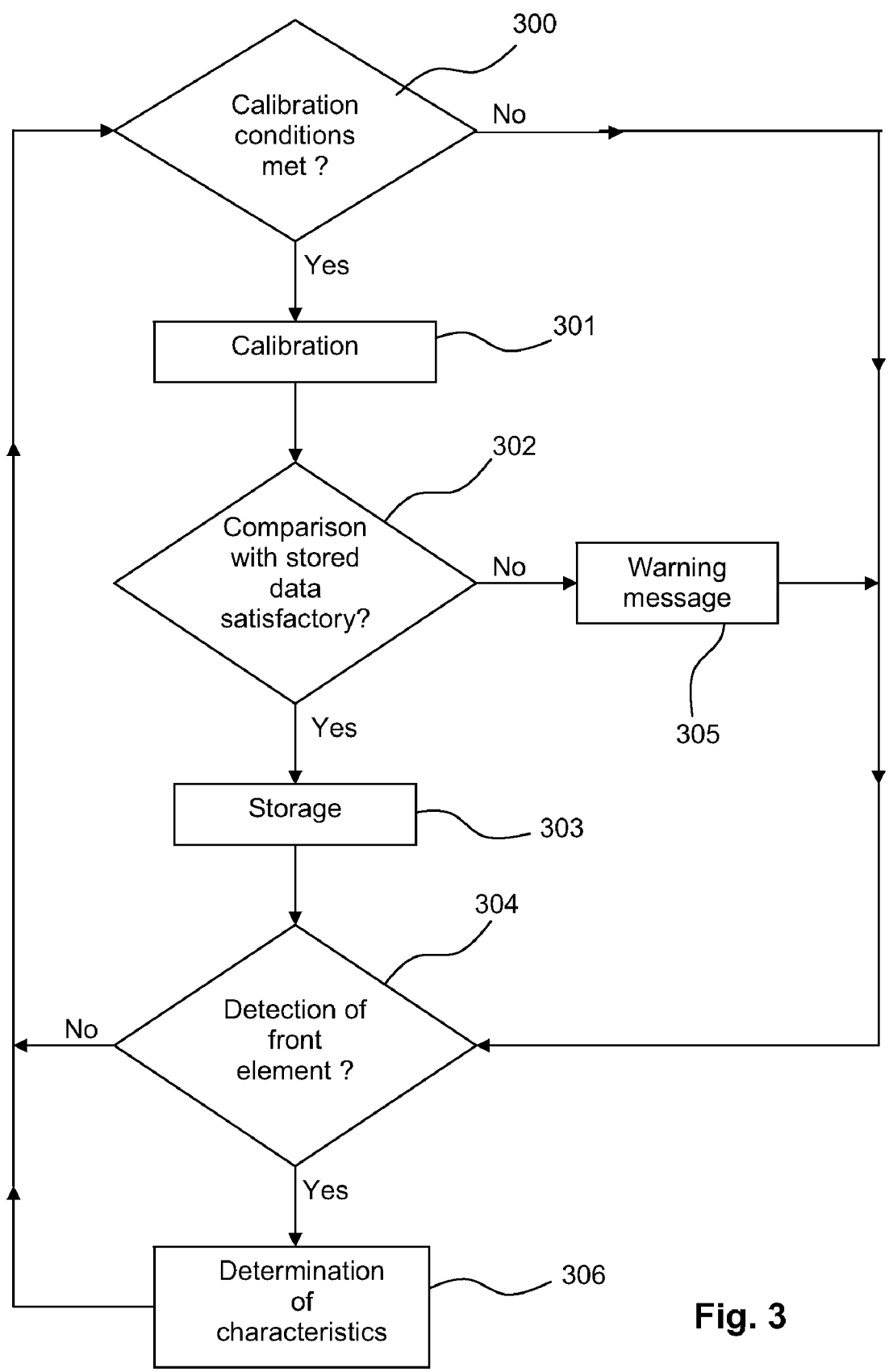
FIG. 3 shows a flowchart illustrating an example of embodiment of the method according to the invention.

FIG. 3 shows a flowchart illustrating one particular embodiment of the method according to the invention.

A first step 300 is a decision step in which it is verified whether calibration conditions are met. A calibration operation is an operation during which the relative positions of the cameras with respect to one another is defined, or redefined, with precision. Special software applications nowadays permit such operations. It is thus possible to adjust a video image captured by one camera with respect to another video image captured at the same point in time by another camera. Typically, the calibration operations are carried out when the vehicle is stationary.

Depending on the embodiments of the method according to the invention, a calibration condition may correspond to one or more of the following conditions: the engine starts up following the introduction of the ignition key; the ignition key is introduced; the vehicle is stationary for a time, with its engine running; the vehicle is stationary for the nth time, with its engine running, since the last calibration operation, n being a predetermined natural number.

If the calibration conditions are met for the vehicle in question, a calibration operation is carried out in step 301, which makes it possible to obtain a precise position of the cameras in space, with reference for example to the orthogonal reference frame 103.

Once the calibration operation has been carried out, a decision step is carried out in step 302 in which the results of the calibration operation that has just been carried out are compared with pre-stored data relating to the relative positions of the cameras; advantageously, the results of the calibration operation are compared only with the last stored relative position of the cameras.

If, at the end of the comparison operation in step 302, it appears that the differences observed between the results of the calibration operation and the last stored relative position(s) of the cameras are less than a first pre-stored threshold value, then it is considered that the results of the calibration operation are satisfactory, and these results are in turn stored in a step 303. These results are then used in a comparison operation following a subsequent calibration operation. In order to detect if the positions of the cameras are moving too far away from their original position, it is advantageously possible to store in a memory the values of the initial positions of the cameras, and to regularly carry out comparisons between these initial positions and the last positions measured so as to check that the difference between these different positions is not greater than a second threshold value; in some embodiments, this last condition is a necessary condition for checking that the last calibration operation is satisfactory, and for proceeding to the storage in step 303.

At the end of the storage step 303, a decision step 304 is carried out in which it is determined whether the vehicle, equipped for example with various appropriate image processing applications, has detected a front element. It is also possible to pass directly to step 304 at the end of the decision step 300 if it is considered that the calibration conditions are not met, or at the end of decision step 302 if it is considered that the results of the last calibration operation are not satisfactory; in this latter case, a warning message is created in a step 305 so as to warn the driver that the cameras have moved significantly since their last stored calibration operation, or from their initial position, which message will incite said driver to carefully consider the information that will be proposed to him concerning the characteristics of a front element.

If a front element is actually detected, the various stereoscopic, and optionally three-dimensional, calculations mentioned above are carried out in a step 306 in order to determine essentially a distance between the vehicle implementing the method according to the invention and the detected front element. If no front element is detected, the method returns to decision step 300.

The method for determining characteristics of a front element as just described can of course be implemented using an additional camera which has an optical axis parallel to the optical axis of the other cameras used. Advantageously, this third camera has an applicate and a height that are different from those of the first two cameras. The third camera makes it possible to perfect the three-dimensional viewing concept, and also makes it possible to carry out additional stereoscopic calculations which are useful:

either for determining, by comparing the different measurements obtained, that one of the cameras has moved substantially, for example as a result of an impact; in this case, the camera in question will no longer be used in the method according to the invention, and only two cameras are actually used according to the principle that has just been described;

or for confirming the calculations previously carried out by means of the two first cameras.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for evaluation, within a motor vehicle, of the characteristics of a front element, said motor vehicle being equipped at least with a first camera and a second camera, wherein the method comprises the steps of:

placing the first camera in a first position and the second camera in a second position, wherein the first position and the second position are placed considering an orthogonal three-dimensional reference frame having an abscissa axis oriented parallel to a direction of displacement of the vehicle, a horizontal applicate axis and a vertical ordinate axis:

the first camera and the second camera respectively have a first optical axis and a second optical axis, respectively, that are generally parallel to the abscissa axis;

the first camera and the second camera have a first offset along the applicate axis;

the first camera and the second camera have a second offset along the vertical ordinate axis;

establishing a first evaluation of a distance separating the vehicle from the front element by using the first offset to carry out a first stereoscopic calculation;

establishing a second evaluation of the distance separating the vehicle from the front element by using the second offset to carry out a second stereoscopic calculation;

determining the distance separating the vehicle from the front element by combining the first distance evaluation and the second distance evaluation; and capturing a first image with said first and second cameras at the same point in time;

said first stereoscopic calculation being made using said first image captured by said first and second cameras and said first offset and said first and second cameras each capturing a second image at the same point in time, said second stereoscopic calculation being made using said second image captured by said first and second cameras and said second offset:

determining said first offset and said second offset prior to said capturing step.

2. The method according to claim 1, comprising the additional step of:

prior to the steps of establishing the first distance evaluation and the second distance evaluation, carrying out a calibration operation on the first and second cameras to determine the relative positions of said first and second cameras.

3. The method according to claim 2, comprising the additional step of storing the relative positions of the cameras for each calibration operation carried out.

4. The method according to claim 3, comprising the various additional steps of:

for each new calibration operation, comparing the obtained relative positions with the last stored relative positions;

if a difference greater than a predetermined threshold results from the comparison operation, indicating a probable error in the determination of the distance separating the vehicle from the front element.

5. The method according to claim 2, wherein the calibration operation is carried out only when the vehicle is stationary.

6. The method according to claim 5, wherein the calibration operation is carried out each time the ignition of the vehicle is started.

7. The method according to claim 5, wherein the calibration operation is carried out when the vehicle, with the engine running, reaches a zero speed.

8. The method according to claim 1, wherein the operation consisting in combining the first distance evaluation and the second distance evaluation, in order to determine the distance separating the vehicle from the front element, is carried out by forming a weighted mean of the first distance evaluation and of the second distance evaluation, the first distance evaluation being associated with a first weighting coefficient and the second distance evaluation being associated with a second weighting coefficient, the first weighting coefficient and the second weighting coefficient respectively depending on a risk factor concerning a risk of variation in the first offset and second offset, respectively.

9. The method according to claim 1, wherein the first camera is arranged at a rear view mirror of the vehicle, and in that the second camera is arranged at a front headlamp of the vehicle.

10. The method according to claim 9, wherein the first camera is also used for an operation of detecting lines and/or curbs, and in that the second camera is used for a functionality directly connected with a lighting functionality.

11. The method according to claim 1, wherein the second offset is used to determine a height of the front element.

12. A motor vehicle equipped at least with a first camera and a second camera for determining, using a stereoscopic calculation, characteristics of a front element, wherein the first camera is placed in a first position and the second camera is placed in a second position, the first position and the second position being placed in consideration of an orthogonal three-dimensional reference frame having an abscissa axis oriented parallel to a direction of displacement of the vehicle, a horizontal applicate axis and a vertical ordinate axis; wherein the first camera and the second camera respectively have a first optical axis and a second optical axis that are generally parallel to the abscissa axis;

the first camera and the second camera have a first offset along the horizontal applicate axis;

the first camera and the second camera have a second offset along the vertical ordinate axis; and capturing a first image with said first and second cameras at the same point in time;

a first stereoscopic calculation being made using said first image captured by said first and second cameras and said first offset and said first and second cameras each capturing a second image at the same point in time, a second stereoscopic calculation being made using said second image captured by said first and second cameras and said second offset;

determining said first offset and said second offset prior to said capturing step.

13. A method for determining a distance between a front element and a vehicle, said method comprising the steps of:

situating a first camera at a first position on the vehicle;

situating a second camera at a second position on the vehicle;

determining a first offset for said first and second cameras along a first axis;

determining a second offset for said first and second cameras along a second axis;

using said first offset to determine a first distance and said second offset to determine a second distance;

establishing a first evaluation of a distance separating the vehicle from the front element by using the first offset to carry out a first stereoscopic calculation;

establishing a second evaluation of the distance separating the vehicle from the front element by using the second offset to carry out a second stereoscopic calculation; and capturing a first image with said first and second cameras at the same point in time;

said first stereoscopic calculation being made using said first image captured by said first and second cameras and said first offset and said first and second cameras each capturing a second image at the same point in time, said second stereoscopic calculation being made using said second image captured by said first and second cameras and said second offset; and using said first and second stereoscopic calculations to determine the distance between the front element and the vehicle.

14. The method as recited in claim 13 wherein said first axis is a horizontal axis and said second axis is a vertical axis.

15. The method as recited in claim 13 wherein an optical axis of each of said first and second cameras is generally parallel to an axis of travel of the vehicle.

16. The method as recited in claim 13 wherein said first camera is arranged on a mirror of the vehicle.

17. The method as recited in claim 13 wherein said second camera is arrange at a front headlamp of the vehicle.

18. The method as recited in claim 16 wherein said second camera is arranged at a front headlamp of the vehicle.

19. The method as recited in claim 13 wherein said second offset is used to determine a height of the front element.

* * * * *